United States Patent [19]

Dickson

[11] 4,267,681
[45] May 19, 1981

[54] RESILIENT STRUCTURES

[75] Inventor: Peter C. Dickson, Runcron, England

[73] Assignee: Dunlop Limited, London, England

[21] Appl. No.: 675,281

[22] Filed: Apr. 9, 1976

[30] Foreign Application Priority Data

Apr. 16, 1975 [GB] United Kingdom ............... 15584/75

[51] Int. Cl.³ ............................................. E04C 2/42
[52] U.S. Cl. ......................................... 52/664; 52/667
[58] Field of Search ................. 52/664, 660, 665, 669, 52/666, 732, 667; 46/27, 28

[56] References Cited

U.S. PATENT DOCUMENTS 3,882,630  5/1975  Bianco ..................................... 46/28
4,005,943  2/1977  Devenish et al. ................. 52/604 X

FOREIGN PATENT DOCUMENTS 2308186  8/1974  Fed. Rep. of Germany .......... 46/28
799175   of 0000  United Kingdom .
1360247  of 0000  United Kingdom .
359322   10/1931  United Kingdom .................. 52/669
996443    6/1965  United Kingdom .................... 46/28

Primary Examiner—Carl D. Friedman
Attorney, Agent, or Firm—Stevens, Davis, Miller & Mosher

[57] ABSTRACT

A resilient three dimensional structure comprising a plurality of interlocked strips each having co-engaging projections and apertures. The projections of one strip engaging apertures of another strip to retain against relative movement perpendicular to the length of said one strip and the apertures of said one strip being engaged by projections in said other strip to retain the two strips against relative movement in a second direction perpendicular to the length of said one strip.

34 Claims, 7 Drawing Figures

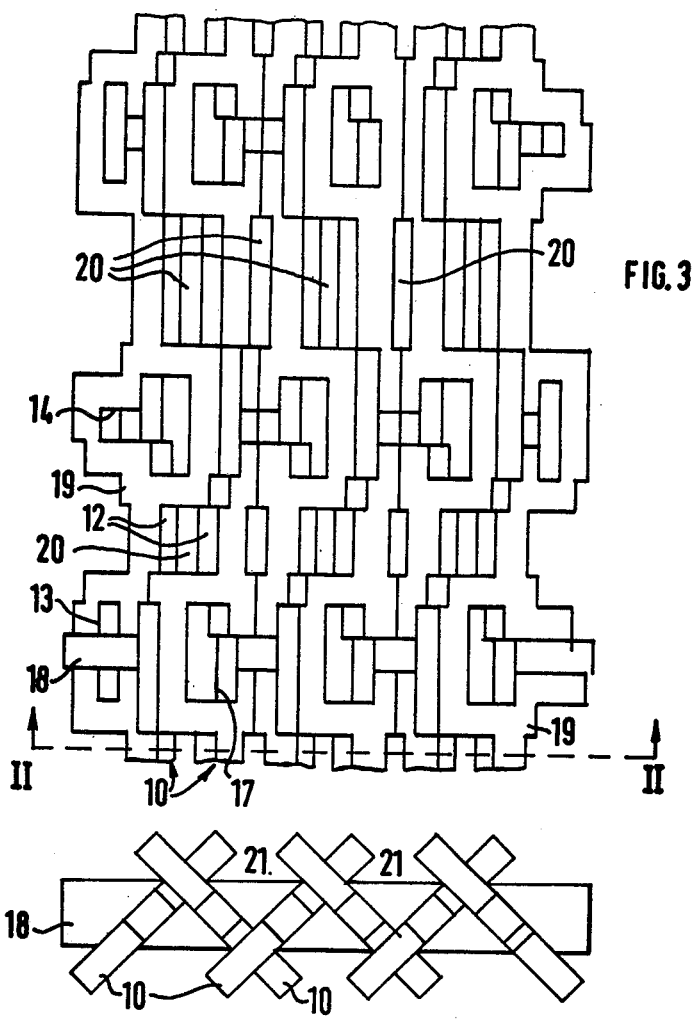

RESILIENT STRUCTURES

This invention relates to resilient structures, including surface coverings and in particular, though not exclusively to open three-dimensional structures for use as covers for ground surfaces, roads and floors.

It is known to construct floor and other surface coverings, such as door mats, from strips of deformable polymeric material, and often scrap material from vehicle tires or rubber conveyor belting is used in these constructions in order to assist in minimizing the cost of the article. There does however remain a not insignificant cost in manufacturing a three-dimensional structure of this kins. Commonly holes are punched in the strips which are then assembled together by link wires passing through the holes of successive strips or alternatively adhesives have to be used to secure the strips relative to each other, but both techniques are time-consuming and represent a cost factor which is significant in relation to the cost of the scrap materials being used.

In addition to manufacturing cost another disadvantage of three-dimensional structures of the aforementioned kind is that they are substantially hard and rigid and therefore are not entirely suitable for use in situations where it is desirable that they should absorb impact energy and reduce shock.

A further disadvantage of previously used constructions of resilient floor coverings when made from rubber is that when used in the presence of water which acts as a lubricant for rubber they do not provide a good grip for vehicles or pedestrians, and also may tend to slip relative to the surfaces on which they are placed.

One object of the present invention is to provide an improved resilient structure.

According to one aspect of the present invention a resilient three-dimensional structure comprises an interlocked assembly of a plurality of strips each formed with a plurality of apertures and projections in engagement respectively with projections and apertures of another strip of the plurality, the projections in one strip of a resilient deformable material engaging apertures in another strip to retain the two strips against relative movement in a first direction perpendicular to the direction of the length of said one strip, and the apertures in said one strip being engaged by projections of said other strip to retain the two strips against relative movement in a second direction perpendicular to the direction of the length of said one strip.

Preferably the strips are of a rectangular cross-sectional shape with apertures and projections formed adjacent or at the edges of the strips. Alternatively, however, the strips may be of other cross-sectional shape, and the apertures and projections may be formed in web-like portions at the edges of the strips. The thickness of a strip may be non-uniform; the thickness may vary across the width of the strip and/or along the length of the strip.

Preferably the strips extend parallel to each other and are all formed of a resilient deformable material.

The cross-sectional shapes and sizes of the strips, the materials from which they are formed, and the spacing between engaging apertures and projections may be selected to result in a structure having the desired resilience. Likewise, these factors, and in particular the materials selected for forming the strips, may be selected to result in a structure having the desired rebound characteristics.

Where the strips are of rectangular cross-sectional shape, adjacent strips preferably are positioned to lie in substantially mutually perpendicular planes, and the projections of one strip may then engage apertures of another strip to provide retention of the two strips against movement in a direction substantially perpendicular to that in which apertures of said one strip and projections of said other strip provide retention. Successive strips may be joined to one another such that in a cross-sectional plane perpendicular to the lengths of the strips the resilient structure has a zig-zag profile similar to that of a saw tooth. In this form of zig-zag profile construction the strips preferably are disposed at equal angles of inclination to the plane in which the assembly of strips lie, or they may be disposed at different angles, both the relative angle between adjacent strips and the inclination of the strips to the general plane in which the assembly of strips lie being selected to assist in providing a three-dimensional structure having the desired resilience and shock absorbing properties.

In a further alternative construction the strips may be disposed some to lie respectively substantially parallel with and some to lie perpendicular to the general plane in which the assembly of strips lie so that in cross-section the resilient structure has a square wave type of profile.

Preferably the projections formed on one strip for engagement with another strip alternate with the apertures formed in said one strip for engagement with projections of said other strip, but alternatively two or more projections or apertures may be formed respectively between successive apertures or projections of a strip.

Apertures and projections may be uniformly spaced along the length of a strip or may be non-uniformly spaced, and where a strip is formed with two sets of apertures and projections for connecting said strip to two other strips the projections and apertures of the two sets of a strip may be either aligned or staggered relative to each other in the direction of the length of the strip.

The edges of each strip in the direction of the length of each strip may be substantially straight so as to form a three-dimensional structure which in effect lies between two substantially flat, planar surfaces. Alternatively at least some of the strips may be profiled along one or more of their edges so as to form a structure which may be considered as lying between surfaces at least one of which is contoured. The strip edges may be specially shaped either parallel with or transversely relative to the length of a strip to provide a good grip for the structure to resist slipping on a supporting surface and also to allow a good grip to be obtained on the structure by for example people, horses, or vehicles moving thereover. In this context the structure could be used as a base to support sheet material which would act as a contact for the above traffic.

The widths of the strips may be such that in the final assembly edges of the strips are all substantially flush with each other. Alternatively at least some of the strips may be constructed and arranged to be inset and/or protrude relative to other strips of the structure.

Additional means for retaining the strips in position relative to each other may be provided by retaining rods which preferably are arranged to extend in a direction perpendicular to the length of the strips. The retaining rods may extend through apertures in the strips and preferably are a close fit in the apertures in order to restrain movement of the strips. Alternatively the rods may be formed with profiled regions to engage and thereby assist in retaining the strips in position; such rods either extending through apertured regions of the strips or engaging edges or outer surfaces of the strips.

Retaining rods may be provided at intervals along the strips or, for example, only near the ends of the strips, i.e. at edge regions of the resilient structure. The retaining rods preferably are formed of a resilient material, and may be formed of the same material as the strips, but may alternatively be formed of a material such as metal which is substantially less resilient than material of the strips. The resiliency and extensibility of the rod must not, however, be too high in order for it to satisfactorily perform a retaining function.

According to another aspect of the present invention a ground covering comprises a resilient three-dimensional structure as described above with the strips disposed so as to define open compartments which are at least partially filled with a ballast material.

The ballast material may, for example, be sand, gravel, earth, grass, grass cuttings or other suitable materials.

Any number of strips may be linked together as required to form a resilient structure section, and separate sections may be linked together to form a larger section.

The lengths of the strips in the structure may be such that in the final assembly edges of the strips are flush with each other at both ends of the structure or alternatively at least some strips may be arranged to be inset or to protrude relative to other strips at at least one of the edges of the structure. Hence the strips may be arranged in the assembly so that sections can be linked together in the general direction of the lengths of the strips to form a larger section.

In addition to structures as described above the invention also provides resilient structure assemblies comprising two or more structures laid one upon the other. Two structures may be linked together and held in multilayer form by providing one structure with some strips of greater width or size than other strips of said structure so that strips of the other structure may be interlocked with the strips of greater width or size to unite the structures. Alternatively two or more layers may be retained in superimposed relationship by means other than the strips of the structures; for example by the use of adhesive, cords, straps, or metal fittings such as staples.

Two or more layers may be arranged adjacent each other or may be spaced from each other. In the latter arrangement a layer of material, which may be an energy absorbing material such as foam, may be provided in the space or spaces between successive layers of the multilayer assembly so as to provide a sandwich-type assembly.

Compartments formed by spaces between successive strips may be filled at least partially with suitable ballast material such as sand, ash, earth or earth and grass, to modify the resilience and other properties of the three-dimensional structures as desired. The compartments may be of a form at least partly open at both upper and lower faces of the structure so that ballast may extend between opposite faces of the structure, so that grass may grow therethrough, and so that water may drain readily therethrough, or the compartments may be of a partly closed form, i.e. open only at one surface of the structure as may be achieved by suitable angling and dimensioning of the strips, so that ballast material or growing grass for example may be contained in and supported by the structure. The latter arrangement clearly enables ballast material to be moved with the structure whenever the structure is moved, as compared with a structure having compartments at least partly open at both faces and which when moved would normally tend to leave behind the ballast material.

Structures in accordance with the present invention are particularly suitable for use as or in forming part of ground covering materials, in particular where it is desired temporarily or otherwise to modify the characteristics of an existing surface. Thus, for example, in situations such as where a packed earth, ash, hard concrete or tarmacadam road crosses a horse racing course and it is desired to soften the surface for the duration of a race meeting, this may be achieved by making use of structures in accordance with the invention. The structures may be covered with, for example, straw or grass cuttings, for appearance. The surface may be constructed to be able to withstand an energy input and absorb energy without producing any significant rebound and without making excessive noise. The compartments, whether open or partly closed, formed between strips of the structure may be at least partly filled with earth and covered with grass cuttings or other material to assist in obtaining the desired surface appearance, or grass may be allowed to grow through open compartments or in partly-closed compartments.

Particularly where it is desired to provide a ground surface covering which is both relatively easily movable and which has vegetation such as grass growing in or through it, a layer of vegetation cohering means may be provided attached, for example by the use of adhesives, alongside a surface of the resilient structure to assist roots to cohere relative to one another and to the structure and thereby resist tearing and undue root damage when the surface covering is being hauled over a surface. The cohering means may be a layer of an initially open-structured material such as a polyurethane foam-like material, or it may be of a material which becomes open-structured upon penetration by roots. The cohering means preferably is non-rigid so that the surface covering may be rolled and unrolled without difficulty and thereby facilitate ease of transportation and temporary storage of the surface covering in roll form.

Where grass is required to grow in partly-closed compartments the strips may be maintained spaced along their edges between interengaging apertures and projections to provide drainage holes to prevent waterlogging of the grass. It will thus be appreciated that the invention is particularly suitable for the provision of portable grass surfaces and the like.

Where a surface is too soft, as for example a muddy region around a gate to a field which is used as a car park during a race meeting, use may be made of structures in accordance with the present invention to assist in retaining an even ground surface in said region and to provide a surface on which vehicle wheels may grip. Where it is intended to improve ground properties on a substantially permanent basis, compartments may be filled at least partly with seeded earth and grass allowed to grow around the structure which will then serve to retain the grass and maintain a substantially even load-supporting ground surface.

In horse-racing applications, structures in accordance with the invention may be used to provide an all-weather gallop surface, and the structure may be laid on a base of limestone chippings or other suitable material which provides drainage. Compartments may be filled at least partly with a ballast material such as sawdust or wood chippings, or grass allowed to grow therethrough.

Structures in accordance with the invention are suitable also for forming rough roads, material such as sand and gravel optionally being provided and retained in the compartments between the strips of the structure.

They may also be used to provide shock absorbing resilient surfaces for helicopter landing pads, and may be laid on aircraft landing areas.

Particularly where the structure is to be used in contact with earth it is preferably formed from a material which is substantially non-rotting and resists microbiological attack.

A structure in accordance with the invention may be secured to a ground surface by the use of securing means such as metal spikes.

The required general compression modulus, resilience, and rebound characteristics of the structure may be obtained by the appropriate selection of materials, such as rubber, polyurethane, or polyvinyl chloride, for the strips and by the use of strips of appropriate cross-sectional shape as discussed above. Preferably the material is provided with a reinforcement, for example a fabric reinforcement, to increase its strength and bending resistance. Additionally or alternatively this may also be obtained by appropriate angling of strips; variation in the angle of disposition of the strip will vary the proportion of an applied load taken by bending and twisting as compared with that taken by direct compression.

In addition to use as ground surface coverings, resilient structures in accordance with the present invention are suitable also for use in packaging including resilient cushioning or bedding arrangements.

Several embodiments of the invention will now be described, by way of example, with reference to the accompanying diagrammatic drawings in which:-

FIG. 2 shows a sectional end elevational view of the structure of FIG. 1 on the line II—II of FIG. 3;

FIG. 3 is a plan view of the structure shown in FIGS. 1 and 2;

Figure 1:
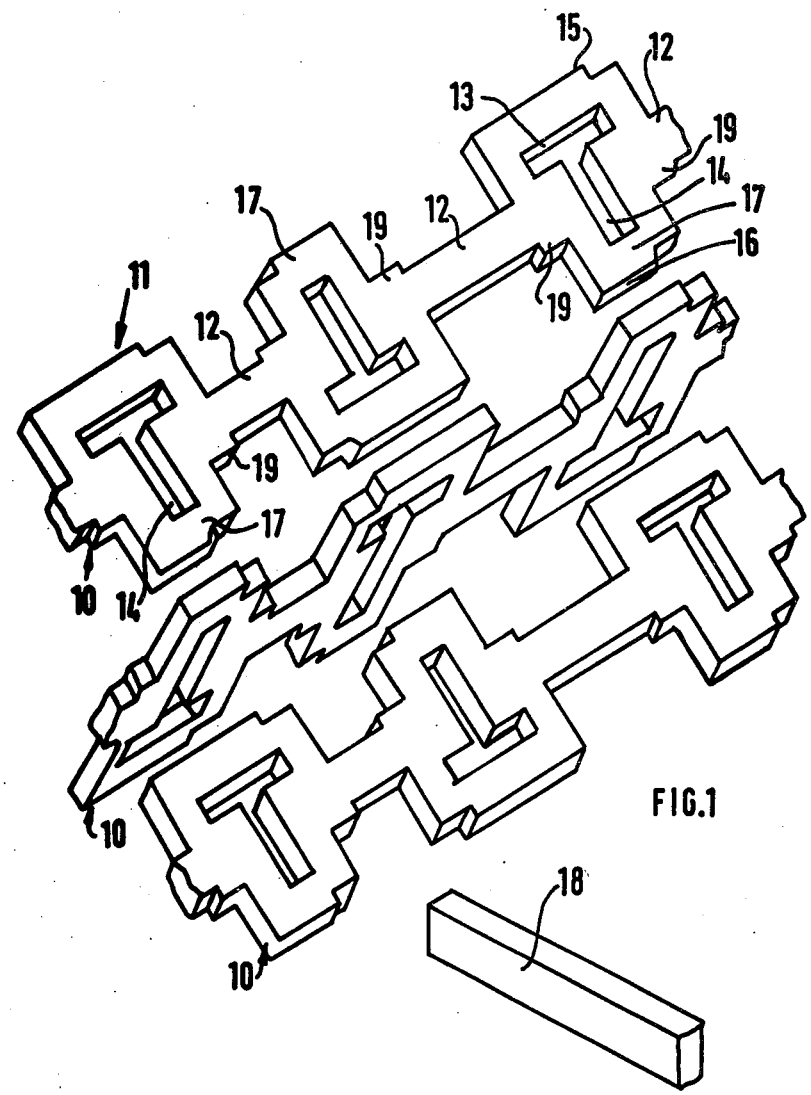
FIG. 1 is an exploded perspective view of part of a resilient three-dimensional part structure in accordance with the present invention.

A resilient three-dimensional structure for use as a ground surface covering comprises a plurality of deformable strips 10 of rectangular cross-sectional shape.

The material for forming the strips is prepared from uncured scrap reinforced-rubber such as that generated in tire manufacture. The scrap material is granulated to chop the reinforcement filaments into lengths of up to one inch, the granulated material then being milled on its surface, calendered into sheet form, and finally vulcanized before being stamped out in the required shape or strip form as described below.

Each strip comprises a plurality of substantially rectangular shaped portions 11 spaced apart and linked together by arm portions 12 formed integral with the rectangular portions. Each rectangular portion 11 defines a T-shaped aperture having a head portion 13 extending substantially parallel with the direction of the length of the strip and tail portion 14 extending transversely relative to the direction of the length of the strip. The head portions 13 of the successive apertures in each strip lie alternately alongside the two edges 15,16 of the strip and provide location for projections of another strip. The strip material defining an end part of each aperture tail portion 14 serves as a projection 17 for engaging the aperture head portions 13 of another strip.

The resilient structure is then assembled by interengaging the apertures and projections along the edge of one strip 10 respectively with the projections and apertures along the edge of another strip 10 so that the two strips then lie in mutually perpendicular planes. The arm portions 12 are sufficiently flexible as to allow the strips to be bent and thereby facilitate interengagement of the successive pairs of co-operating apertures and projections. Additional strips 10 are then added to the interengaged pair of strips to form a structure having a substantially zig-zag shaped end section as shown in FIG. 2.

Retaining rods 18 (see FIG. 1) of a similar material to that of the strips 10 are inserted through the aligned aperture tail portions 14 of successive interengaged strips and thus extend in a direction transverse relative to the direction of the length of each strip 10 as shown in FIG. 3.

The retaining rods 18 not only assist the interengaging pairs of apertures and projections to secure successive strips together but also assist in maintaining successive strips in planes substantially perpendicular to each other as shown in FIG. 2 by resisting flattening of the structure and extension thereof in the direction of the length of the retaining rods under the action of loads on the structure.

In the assembled construction the arm portions 12 of adjacent strips are maintained spaced by shoulder portions 19 formed by the strip material between each arm portion and each side of a projection 17. Longitudinal slots 20 are thus formed in the structure between adjacent strips and these provide for drainage of any ballast material in open-compartments 21 defined by the spaces between the rods and strips.

Figure 4:
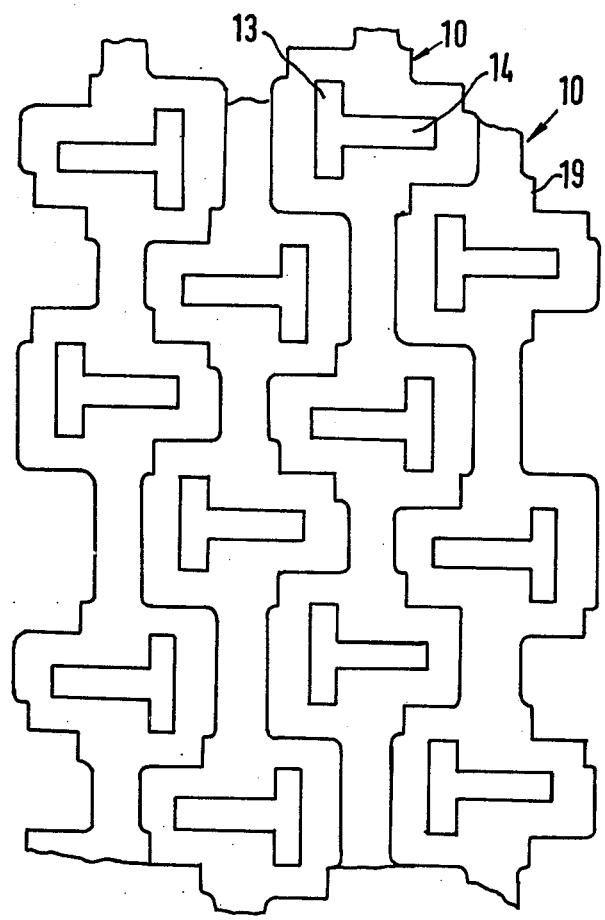
FIG. 4 shows four of the strips of the FIG. 1 structure laid side-by-side.

The spacing of the projections and apertured portions along each strip is such that the strips may be stamped or cut out from a sheet of material in the manner indicated by FIG. 4 without waste of material except for that at the edges of the sheet and that removed to form the apertured portions 13,14. The successive interengaging pairs of apertures and projections are therefore not uniformly spaced along the length of the strips as can be seen in FIG. 1. In forming an alternative structure, material of the sheet or strip may, however, be cut away so as to form a structure in which interengaging pairs of apertures and projections are spaced uniformly.

In use of the surface covering structure so formed, the application of a load over an area of the covering structure causes bending and deformation of the strips and the covering structure will present an increasing resistance to deformation when compressed. As discussed earlier in the specification this and other characteristics may be selected as desired by suitable choice of materials, sizes, cross-sectional shapes and relative disposition of the strips. The filling or ballast in the compartments can, by the amount or by the type of materials selected, be used to modify or adjust the compression and rebound characteristics of the structure and also its gripping properties and appearance.

If the covering is buried in earth just below ground surface and has grass growing therein the compartments will assist in retaining the grass in position even under extremely wet conditions. The angling of the strips relative to the ground surface is found in this case to be particularly beneficial in keying the covering to underlying earth and improving stability of the structure.

Figure 5:
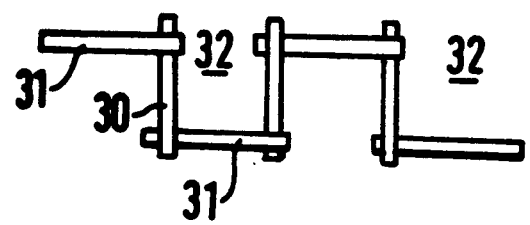
FIG. 5 shows an end elevational view of another structure in accordance with the present invention.

In a second embodiment of the invention (illustrated in FIG. 5) strips 30,31 are constructed substantially as described in respect of the preceding embodiment of the invention but the strips 30,31 are connected such that successive strips are parallel and perpendicular to the general plane containing the structure, thereby forming a series of compartments 32 of rectangular cross-sectional shape.

Figure 6:
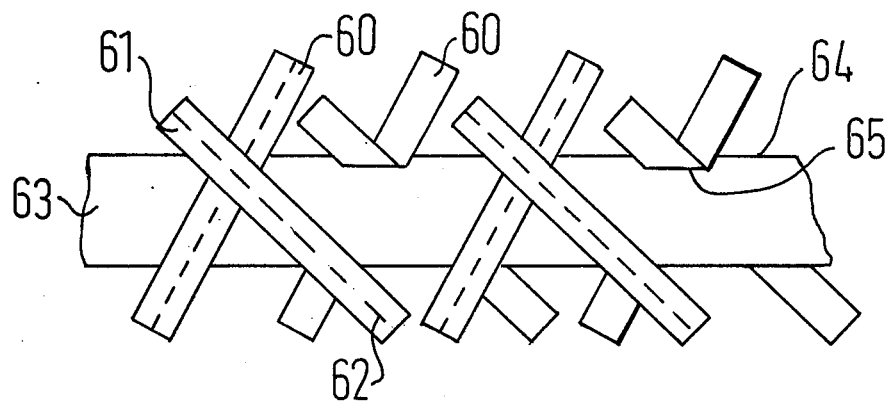
FIGS. 6 and 7 each show modified forms of the construction shown in FIGS. 1 to 4.

In a third embodiment illustrated in FIG. 6a resilient structure is constructed substantially similar to that of FIGS. 1 to 4 except that the strips 60, 61 have a fabric reinforcement 62 and some of the strips 60, are at a different angle of inclination to the retaining rod 63 than the strips 61. Additionally it will be seen that strips 60 are of a greater length in cross-section so as to protrude further than strips 61 beyond the edges 64 of the retaining rod 63, the edges 64 being profiled as at region 65 to assist in retaining in position the strips 60, 61.

Figure 7:
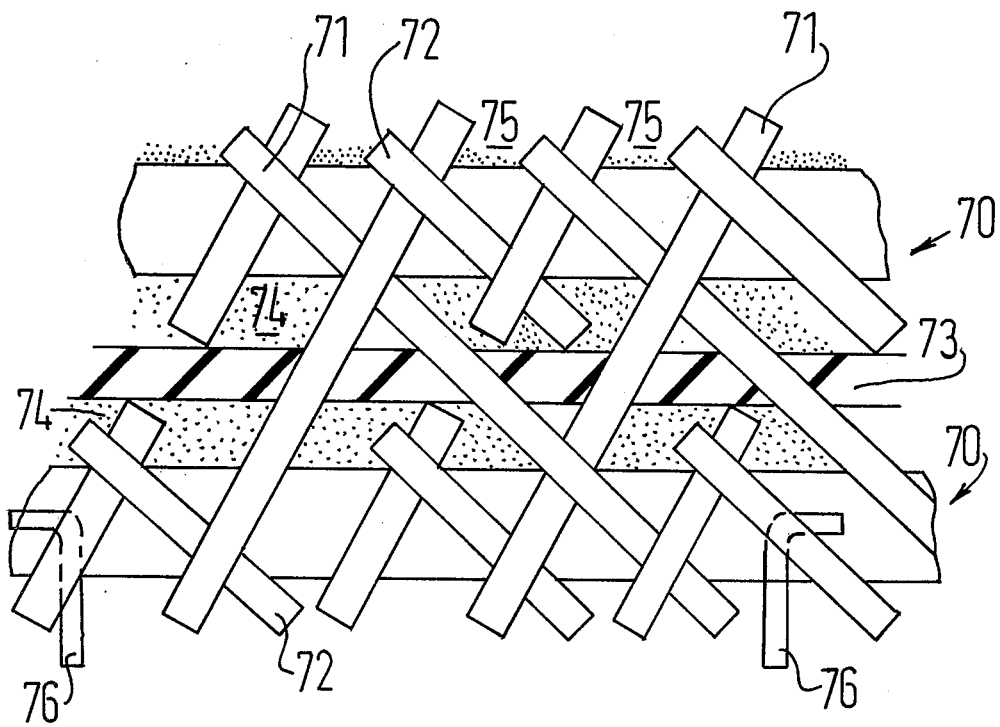

In the embodiment illustrated in FIG. 7 a composite covering comprises two structures 70 similar to FIGS. 1 to 4 arranged in a spaced superimposed manner by virtue of link strips 71 which interconnect with the strips 72 of each structure 70. Foam strips 73 are provided between the structures 70 and this is covered in places by ballast material 74. Ballast is also provided in the compartments 75 of the upper structure. Metal spikes 76 enable the covering to be secured to a ground surface.

While in the embodiments described the strips are mechanically interlocked and may subsequently be detached or separated into sections for transport or storage, the strips may additionally be secured together by the use of adhesives, or fusing (in the case of thermoplastic materials), and/or film covering by means of, for example, a dipping process.

Having now described my invention, what I claim is:

1. A resilient three-dimensional structure comprising: an interlocked assembly of a plurality of parallel strips arranged such that successive strips lie in planes angled relative to one another, each strip being of substantially rectangular cross-sectional shape and formed with a plurality of apertures and projections in engagement respectively with projections and apertures of another strip of the plurality, the projections in one strip of a resilient deformable material engaging apertures in another strip to retain the two strips against relative movement in a first direction perpendicular to the direction of the length of said one strip, and the apertures in said one strip being engaged by projections of said other strip to retain the two strips against relative movement in a second direction perpendicular to the direction of the length of said one strip; and, a plurality of retaining rods in contact with said strips and extending through said apertures in a direction perpendicular to the direction of said strips to provide an additional means retaining the strips in position relative to one another.

2. A structure according to claim 1 wherein each strip is of uniform thickness.

3. A structure according to claim 1 wherein the strips are all formed of a resilient deformable material.

4. A structure according to claim 3 wherein the material is provided with a fabric reinforcement.

5. A structure according to claim 3 wherein successive strips are joined to one another such that in a cross-sectional plane perpendicular to the length of the strips the resilient structure has a zig-zag profile similar to that of a saw-tooth.

6. A structure according to claim 5 wherein the strips are disposed at equal angles of inclination to the plane in which the assembly of the strips lie.

7. A structure according to claim 5 wherein the strips are disposed at different angles of inclination to the plane in which the assembly of the strips lie.

8. A structure according to claim 1 wherein adjacent strips are positioned to lie in substantially mutually perpendicular planes, and the projections of one strip engage apertures of another strip to provide retention of the two strips against movement in a direction substantially perpendicular to that in which apertures of said one strip and projections of said other strip provide retention.

9. A structure according to claim 8 wherein the strips are disposed some to lie respectively substantially parallel with and some to be perpendicular to the general plane in which the assembly of the strips lie so that in cross-section the resilient structure has a square wave-type of profile.

10. A structure according to claim 1 wherein the projections formed on one strip for engagement with another strip alternate with the apertures formed in said one strip for engagement with projections of said other strip.

11. A structure according to claim 1 wherein apertures and projections are uniformly spaced along the length of the strip.

12. A structure according to claim 1 wherein a strip is formed with two sets of apertures and projections for connecting said strip to two other strips and the projections and apertures of the two sets of a strip are aligned relative to each other in the direction of the length of the strip.

13. A structure according to claim 1 wherein the edges of each strip in the direction of the length of each strip are substantially straight so as to form a three-dimensional structure which in effect lies between two substantially flat planar surfaces.

14. A structure according to claim 1 wherein the widths of the strip are such that in the final assembly the edges of the strips are substantially flush with each other.

15. A structure according to claim 1 wherein said retaining rods extend through apertures in the strips and are a close fit in the apertures in order to restrain movement of the strips.

16. A structure according to claim 1 wherein said rods are formed with profiled regions to assist in retaining the strips in position relative to one another.

17. A structure according to claim 1 wherein said retaining rods are provided at intervals along the strips.

18. A structure according to claim 1 wherein said retaining rods are formed of a resilient material.

19. A structure according to claim 1 wherein said retaining rods are formed of a material such as metal which is substantially less resilient than the material of the strips.

20. A ground covering comprising a resilient three-dimensional structure as claimed in claim 1 with the strips disposed so as to define open compartments.

21. A ground covering according to claim 20 wherein the compartments are at least partially filled with a ballast material.

22. A ground covering according to claim 20 wherein the lengths of the strips in the structure are such that in the final assembly, edges of the strips are flush with each other at both ends of the structure.

23. A ground covering according to claim 20 wherein some of the strips are arranged to be inset or to protrude relative to other strips at at least one of the edges of the structure.

24. A ground covering according to claim 20 wherein two or more structures are laid one upon the other.

25. A ground covering according to claim 24 wherein two structures are linked together and held in multi-layer form by providing one structure with some strips of greater width or size than other strips of said structure so that strips of the other structure are interlocked with the strips of greater size or width to unite the structures.

26. A ground covering according to claim 25 wherein two or more layers are retained in superimposed relationship by adhesive means.

27. A ground covering according to claim 24 wherein compartments formed by spaces between successive strips are filled at least partially with a suitable ballast material.

28. A ground covering according to claim 20 wherein two or more layers are arranged spaced from each other, a layer of sheet material being provided in the space or spaces between successive layers of the multi-layer assembly so as to provide a sandwich-type assembly.

29. A ground covering according to claim 27 wherein the compartments are at least partly open at both upper and lower faces of the structure so that ballast may extend between opposite faces of the structure.

30. A ground covering according to claim 27 wherein the compartments are partly closed.

31. A ground covering according to claim 20 wherein a layer of vegetation cohering means is secured alongside a surface of the resilient structure.

32. A ground covering according to claim 31 wherein the cohering means is a layer of an open structured polyurethane foam.

33. A ground covering according to claim 32 wherein the cohering means is non-rigid so that the ground covering may be rolled and unrolled without difficulty.

34. A ground covering according to claim 20 wherein the structure is provided with metal spikes to enable the covering to be secured to a ground surface.

* * * * *